May 22, 1923.
D. A. HEDGLIN
1,456,021
AUTOMOBILE WHEEL LOCK
Filed Feb. 18, 1921
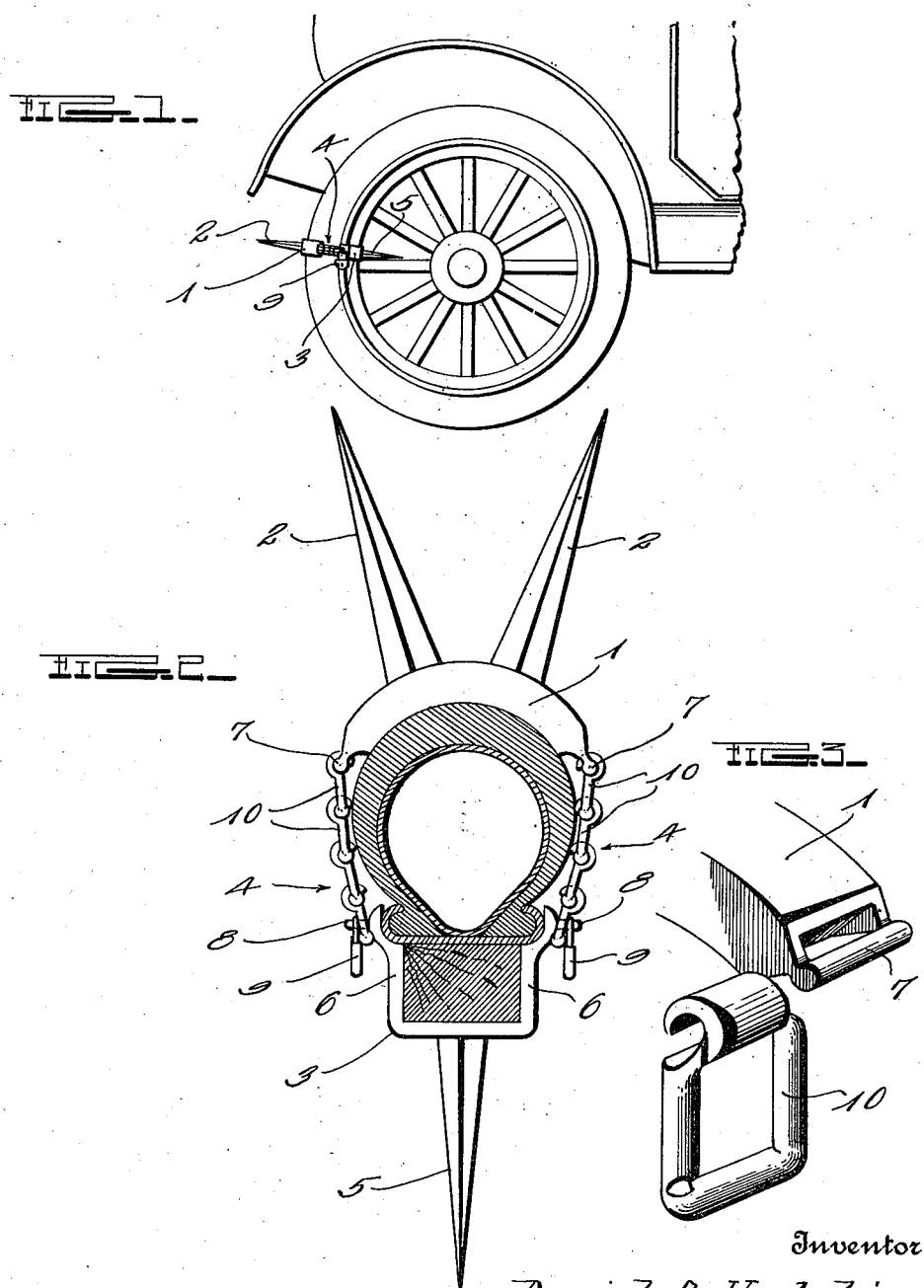
Inventor
Daniel A. Hedglin
Witness Patented May 22, 1923.

1,456,021

UNITED STATES PATENT OFFICE.

DANIEL A. HEDGLIN, OF SAN FRANCISCO, CALIFORNIA.

AUTOMOBILE WHEEL LOCK.

Application filed February 18, 1921. Serial No. 445,970.

*To all whom it may concern:*

Be it known that I, DANIEL A. HEDGLIN, a citizen of the United States, residing at San Francisco, in the county of San Francisco and State of California, have invented certain new and useful Improvements in Automobile Wheel Locks; and I do declare the following to be a full, clear, and exact description of the invention, such as will enable others skilled in the art to which it appertains to make and use the same.

This invention relates to improvements in automobile wheel locks of the type which are sometimes known as chocks and encircle the tire and rim and include a spur or the like to engage the ground to prevent easy revolving of the wheel and thus prevent use of the car by unauthorized persons.

The principal object of the invention is to generally improve upon locks of this class by the provision of one which is simple in construction and embodies tire and rim engaging members, the first named member being equipped with the usual spurs and the last named member being also equipped with a spur which extends in the direction of the wheel hub. With the ordinary marketed types of wheel locks, it is possible to deflate the tire and turn the lock in such a way as to render it entirely ineffective and at the same time prevent the spur from coming into engagement with the fender or other adjacent parts of the car. However, by equipping the rim engaging member with an additional projection in the form of a spur, it will be practically impossible to turn the lock in such a way as to permit rotation of the wheel without one of such spurs coming into engagement with the fender and thus preventing free rotation of the wheel.

Another and important object of the invention, is to provide a device of this class embodying the aforesaid members, the same being connected in such a way that they may be adjusted to fit various sizes of wheels and tires, and the rim-engaging member being of such construction that, unless the tire is entirely deflated, its arms, which are comparatively long, will not clear the inner periphery of the wheel rim. Thus, rotation of the device about the tire and rim is prevented to a great extent in this way.

Other objects and features of the invention will be apparent during the course of the following description.

In the accompanying drawings forming a part of this specification and in which like numerals are employed to designate like parts throughout the same:

Figure 1 is a side elevation of an automobile wheel equipped with a lock constructed in accordance with my invention.

Figure 2 is an enlarged sectional view taken through the tire adjacent the lock, showing more clearly the construction and arrangement of the parts of the latter.

Figure 3 is a detail perspective view of one end of the tire tread engaging member with one of the links of the chain shown.

In carrying out the invention, I make use of an outer tread engaging member 1 in the form of a band shaped to conform to the tread portion of the tire and this band, as is usual, is equipped with one or more spurs 2 which are designed to become embedded in the pavement or ground in case an attempt is made to get away with the car. The inner rim-engaging member 3 is U-shaped in general outline and is adapted to snugly fit the rim of the wheel. At this point, I wish to state that these members 1 and 3 may be connected together in any suitable way. In the showing, however I have disclosed chains 4 for the purpose. Before referring more specifically to these chains and the manner in which they are associated with the parts 1 and 3, I will further and more specifically describe the rim-engaging member 3 which, as before stated, is equipped with a lateral projection 5 preferably in the form of a spur. When the device is in use, this projection 5 extends toward the hub of the wheel to render it ineffective and to prevent it from coming into contact with the fender or any other adjacent parts of the car. Also, the arms 6 of the member 3 are comparatively long and are shaped at their outer ends to effectively engage the rim of the tire. It is the purpose of equipping this rim-engaging member with these long arms to prevent this member from being moved inwardly toward the hub of the wheel and then to one side to permit the device to be positioned on the tire in such a way as to render the spurs 2 ineffective. In other words, by providing these comparatively long arms 6, they will not clear the inner periphery of the wheel rim even if the tire is deflated. However, if an attempt is made to rotate the device and such an attempt is successful, the spur 5 or spurs 2 will come into play and it will be seen that one of these spurs will engage the fender and prevent easy rotation of the wheel and in this way prevent the car from being stolen.

Now, by again referring to the connecting chains for the members 1 and 3, I wish to state that as disclosed in Fig. 3, the band 1 is formed at its opposite ends with anchoring heads 7 for the adjacent end links of the chains 4. On the other hand, the other end links of the chains are connected to eyes 8 with which the arms 6 are provided, pad-locks 9 serving to prevent disconnection of the chains from these eyes. I make no claim to the particular kind of a chain employed for connecting the members 1 and 3 together. However, I prefer to use a well known type of chain which is now on the market, this chain being made up of a plurality of easily and readily disconnectible links 10 of the type clearly shown in Fig. 3. With this type of chain, it is obvious that by disposing any two of the links at right angles to each other and moving one of the links in the proper direction, the chain can be shortened or lengthened as the case may be. Thus, my lock is adaptable for effective use on various sizes of tires. I again wish to emphasize the fact that while I have shown a chain for connecting the parts 1 and 3 together, I wish it to be understood that these parts could be directly hinged together or could be connected together in various other ways.

The manner of applying the device on a wheel is thought to be obvious and also the manner of adjusting it to various sizes of tires by removing and inserting links of the chain is likewise thought to be obvious. Therefore, a more lengthy description is deemed unnecessary since the foregoing description is thought to be sufficient to enable persons skilled in the art to which the invention relates to obtain a clear understanding of the same.

Since probably the best results may be obtained with the construction and arrangement herein shown and described, this construction and arrangement is taken as the preferred embodiment of the invention. However, as before stated, various minor changes within the scope of the claims may be resorted to.

I claim:

1. An automobile wheel lock of the type specified comprising a substantially arcuate tire tread engaging member for transverse disposition on the tire, said member having comparatively small heads at its opposite ends spaced from the body portion and connected thereto through the medium of necks, ground-engaging means carried by said tread member, a substantially U-shaped wheel rim engaging member having comparatively long side portions or arms having their extremities shaped to engage the tire rim, eyes carried by said extremities, connecting chains having their end links engaged with the aforesaid heads and said eyes respectively, padlocks for co-operation with said eyes to connect the adjacent end links therewith, and a spur integral with the intermediate or connecting portion of the wheel rim engaging member, said spur being intended for disposition between the spokes of the wheel and having its free end directed toward the hub of the wheel, said spur serving to prevent rotation of the device in the manner described.

2. An automobile wheel lock of the type specified comprising a substantially arcuate tire tread engaging member for transverse disposition on the tire, said member having heads forming cross bars at its opposite ends substantially circular in cross section and spaced from the body portion and connected thereto through the medium of necks, ground-engaging means carried by said tread member, a substantially U-shaped wheel rim engaging member having comparatively long side portions or arms having their extremities shaped to engage the tire rim, eyes carried by said extremities, connecting chains having their outer end links provided with hooks engaged with the aforesaid heads and having their inner end links engaging said eyes, and padlocks for co-operation with said eyes to connect the adjacent end links therewith.

In testimony whereof I have hereunto set my hand in the presence of two subscribing witnesses.

DANIEL A. HEDGLIN.

Witnesses:
M. G. STIRLING,
FRANK GIBLIN.